United States Patent [19]
Bethke

[11] 3,768,918
[45] Oct. 30, 1973

[54] TEMPLATE BUSHING AND LOCKING MEANS

[76] Inventor: Dale L. Bethke, 2924 Mesa Drive, West Covina, Calif. 91791

[22] Filed: July 28, 1971

[21] Appl. No.: 166,770

Related U.S. Application Data

[63] Continuation-in-part of Ser. No. 848,420, Aug. 8, 1969, abandoned.

[52] U.S. Cl............................ 408/72 B, 408/241 B
[51] Int. Cl............................................. B23b 49/02
[58] Field of Search.................. 408/72 B, 115 B, 408/241 B; 16/2

[56] References Cited
UNITED STATES PATENTS

| | | | |
|---|---|---|---|
| 2,424,485 | 7/1947 | Miller | 408/115 B |
| 1,831,813 | 11/1931 | Levedahl | 408/81 |
| 3,204,284 | 9/1965 | Merriman | 408/241 B |
| 3,108,500 | 10/1963 | Merriman | 408/241 B |
| 3,158,045 | 11/1964 | Siler | 408/115 B |
| 2,920,509 | 1/1960 | Bennett | 408/72 B |

*Primary Examiner*—Francis S. Husar
*Attorney*—Spensley, Horn & Lubitz

[57] ABSTRACT

A bushing having a bore for guiding a drill bit and means for locking the bushing to a template or jig is disclosed. The bushing, which is particularly suitable for thin templates or jigs, has an exterior chamfer on one end for engaging a countersunk aperture in the template and left-hand threads disposed about its other end. A lock ring, adaptable for engaging the left-hand threads on the bushing rigidly couples the bushing to the template. The torque of a drill bit engaging the bushing bore tends to tighten the lock ring to the template; thus, the bushing remains secure during use.

4 Claims, 11 Drawing Figures

Patented Oct. 30, 1973

DALE L. BETHKE
INVENTOR.

BY Spensley & Horn
ATTORNEY

Patented Oct. 30, 1973

DALE L. BETHKE
INVENTOR.

BY
Spensley & Horn
ATTORNEYS

TEMPLATE BUSHING AND LOCKING MEANS

This is a continuation-in-part application of Ser. No. 848,420, filed on Aug. 8, 1969 and now abandoned.

BACKGROUND OF THE INVENTION

1. Field of the Invention

The invention relates to drill bushings and means for fastening drill bushings to a template or jig.

2. Prior Art

Numerous methods and devices are presently used for coupling and rigidly holding a drill bushing to a template or jig. All of the existing template bushing and fastening means have disadvantages which make them difficult to use or limit the applications in which they may be used. This is particularly true for those bushings which are made for use with thin jigs or templates. While the thin templates have the advantage of being less expensive to fabricate and easier to handle, they present a more difficult problem for attaching a bushing and maintaining it at the desired location since the length of the aperture through the template into which the bushing must be secured, is considerably smaller than the aperture length in a thick template or jig.

In U.S. Letters Patent No. 1,237,143, one prior art method is disclosed for securing a bushing to a thin template or jig. In this patent, a strap, which is riveted at its ends to the template, is used for securing a bushing to the template. The strap engages the tool receiving end of the bushing, thereby securing the bushing to the template. One of the disadvantages to this method is that it requires the drilling and countersinking of at least two additional holes into which the rivets are disposed. Since it is difficult to accurately locate the rivet receiving holes with the bushing aperture, this method of securing a bushing often results in an improperly aligned or located bushing. Additionally, the bushing may become cocked during its use since the strap does not provide adequate lateral support. Another disadvantage of this bushing and locking means is the fact that the bushing is difficult to remove and typically, the bushing and strap, after removal, are not usable.

In U.S. Letters Patent No. 2,920,509, another prior art device for securing a bushing to a thick template is described, In this disclosure a ring or collar, which rests on the template, clinches the tool receiving end of the bushing, securing it to the template. One problem with this device is that it does not always prevent the bushing from rotating relative to the template while the bushing is guiding a tool. Also, excessive clinching pressure may distort the thin template. Additionally, each bushing is only adaptable for use with a single template thickness; thus, a plurality of bushings must be stocked if the bushings are to be used with templates of different thickness. Removal of this type of locking means results in the destruction of the locking means and often damage to the bushing itself.

Another bushing which is used with thin templates includes a flared end which fits into an aperture in the template or jig. Typically, the bushing is hammered into the template and can become readily cocked due to improper hammering. Where the bushing is not perfectly flared the bottom flared extension becomes an obstruction. In removing the bushing, it often must be drilled out and it is generally not reusable and the hole is distorted.

Another prior art method of securing a bushing to a thin template includes the use of a self-clinching press fit bushing. The bushing is pressed into an aperture in the template and it requires the use of expensive installation equipment. The bushing tends to become cocked due to improper initial alignment. Additionally, the edges of the bushing receiving aperture in the template become distorted after the bushing is removed and often the template and bushing are not reusable.

In U.S. Letters Patent No. 3,108,500, a method for securing a bushing in a thick template is disclosed which includes a snap ring. This method has the disadvantage of not always satisfactorily securing the bushing to the template. The snap ring may not be reused once it is removed from the bushing.

Other locking means and bushings often referred to as slip removable bushings which require the drilling of apertures into the template other than the aperture into which the bushing is placed are disclosed in U.S. Letters Patents Nos. 3,244,034 and 3,336,822.

Additionally, other locking means and bushings referred to as fixed slip bushings which also require apertures in the template other than the aperture for receiving the bushing are disclosed in U.S. Letters Patent No. 2,997,902 and British Patent No. 546,926.

SUMMARY OF THE INVENTION

A template or jig drill bushing and locking means is described which comprises a bushing which guides a drill through a template and an outer locking ring for securing the bushing to the template. The bushing contains a chamfered base end which is made to engage a countersunk or dimpled bore in a thin plate or template. The other end, or top end, of the bushing comprises a left-hand thread. A cylindrical lock ring with inner threads adaptable for engaging the matching threaded bushing secures the bushing to the template by pulling the angular or chamfered end tightly within the dimpled or countersunk aperture, or against a flat surface surrounding the aperture where no countersink or dimple is present. The torque exerted on the bushing when the bushing is guiding a drill bit tends to tighten the lock ring against the template, thus causing the bushing to remain rigidly secured or to become more secured to the template during use.

It is an object of the present invention to provide a template bushing and locking means which may be readily installed in a template without bending or otherwise damaging the template and wherein the bushing becomes more secured to the template with use.

Another object of the present invention is to insure that a drill is guided at a predetermined angle relative to a template, typically at an angle of 90°.

It is a further object of the present invention to provide a locking means for the drill bushing wherein a single locking means may be used with a plurality of bushings having different inside diameters.

It is still another object of the present invention to provide a drill bushing and locking means which are reusable, readily removable and replaceable.

It is still another object of the present invention to provide a drill bushing and locking means wherein a single drill bushing and locking means may be utilized with templates of different thicknesses.

Another object of the present invention is to provide a bushing that may be used with an aperture made with standard drills or punches.

Another object of the present invention is to provide a bushing which is self-aligning and automatically aligns itself with the template or jig.

Still another object of the present invention is to provide a bushing and locking means which does not require the use of any aperture in a template, except the bushing receiving aperture.

DETAILED DESCRIPTION OF THE INVENTION

Figure 1:
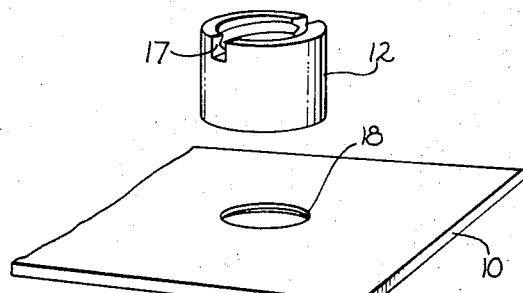
FIG. 1 is a perspective view of the drill bushing, lock ring and section of a template or jig prior to their assembly.
Figure 2:
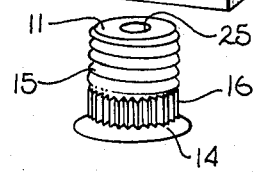
FIG. 2 is a cross-section of a template illustrating the countersunk or dimpled aperture into which the drill bushing is placed.
Figure 3:
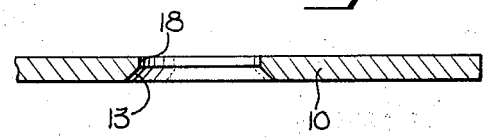
FIG. 3 illustrates the drill bushing and its left-hand threads engaging an aperture in a template.
Figure 4:
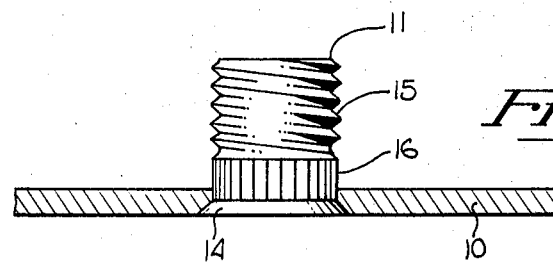
FIG. 4 illustrates a drill bushing engaging an aperture of a template where the bushing is secured to a template by a lock ring.

The drill bushing, locking means and template or jig are illustrated in FIG. 1 as bushing 11, lock ring 12 and template 10, respectively. The bushing 11 and lock ring 12 are illustrated prior to their assembly into template 10. The bushing 11 illustrated in FIGS. 1, 3 and 4, is a generally cylindrical member having a bore 25 axially disposed through its body. The bore 25 is adaptable and used for guiding a drill bit when the bushing is secured to a template or jig. An exterior enlargement such as chamfer 14, which is disposed peripherally about the exterior of one end of bushing 11, has a maximum diameter greater than the diameter of the remainder of bushing 11. Thus, when bushing 11 is placed in an aperture such as circular aperture 18 whose diameter is approximately equal to the diameter of bushing 11, the bushing is unable to completely pass through the aperture since the chamfer 14 will engage or abut one surface of the template 10. Left-hand threads 15 are disposed exteriorly about the periphery of the other end of the bushing. A knurl or serration 16 is exteriorly disposed about or defined by bushing 11 between the left-hand threads 15 and the chamfer 14. The maximum diameter of the serration 16 is larger than or approximately equal to the maximum diameter of the left-hand threads 15. The bushing 11 may be made from steel, aluminum or other metals and may be hardened, utilizing commonly known techniques.

Figure 5:
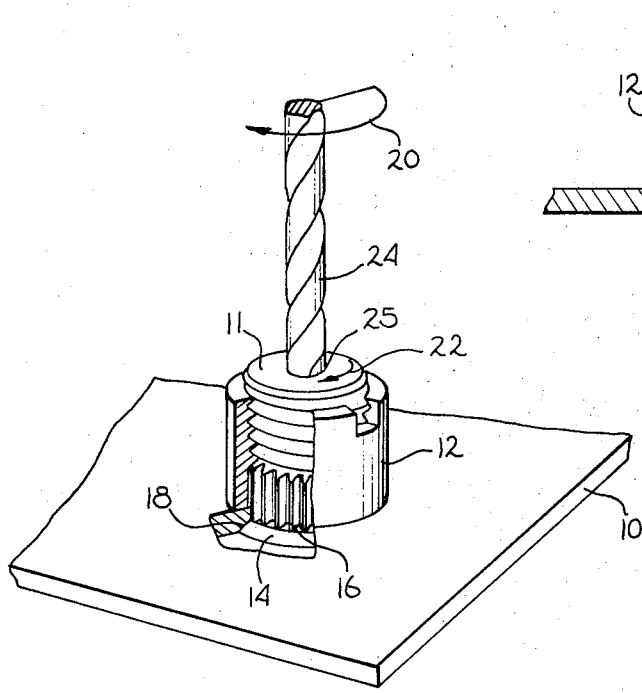
FIG. 5 illustrates a perspective view of a drill bit engaging a drill bushing where the bushing is secured to a template; the bushing, lock ring and template are illustrated in a sectional view.

Lock ring 12 comprises a cylindrical sleeve most clearly seen in FIGS. 1, 4 and 5. Threads 19 are disposed about the inner surface of lock ring 12 at one end, said threads being adaptable for cooperatively engaging the left-hand threads 15 of bushing 11. The lock ring 12 has an annular surface 23 which is adaptable for engaging a surface of template 10 when the lock ring is made to engage the threads of bushing 11 as illustrated in FIG. 4. The inside diameter of the non-threaded interior of lock ring 12 should be counter-bored larger than the maximum diameter of serration 16 so that the lock ring may be readily threaded onto bushing 11 as illustrated in FIG. 4. The lock ring may be made of aluminum or other metals utilizing commonly known techniques. A pair of notches 17 are diametrically cut into one end of lock ring 12. The notches are utilized for engaging an adjusting wrench, such as the tool shown in FIG. 8, so that lock ring 12 may be tightened or loosened onto bushing 11.

The drill bushing 11 is typically utilized in conjunction with a thin metal plate or jig such as template 10 illustrated in FIGS. 1 through 5. An aperture, such as circular aperture 18, is disposed through template 10 at the location where it is desired to locate the drill bushing on the template. The aperture 18 may be countersunk or dimpled, as is illustrated by countersink 13 of FIG. 2. The dimple or countersink 13 should be adaptable for engaging chamfer 14 as is illustrated in FIG. 3, such that the bottom of bushing 11 is flush with or does not protrude below the surface of template 10 and become an obstruction. The bushing 11 is pressed into aperture 18 and partially prevented from rotating within the aperture by serrations 16 which tend to grip the portion of template 10 defining aperture 18.

After the bushing 11 has been placed within aperture 18, lock ring 12 is threaded onto the left-hand threads 15 of bushing 11 such that surface 23 of lock ring 12 engages a surface of template 10 as is shown in FIG. 4. As the lock ring 12 is tightened, the chamfer 14 securely engages dimple or countersink 13, firmly holding the bushing 11 in place on template 10.

Referring to FIG. 5, bushing 11 is illustrated secured to the template 10 by means of lock ring 12. A drill bit 24 is illustrated engaging the bushing. Since the bore 25 of the bushing communicates with the aperture 18, the drill bit 24 is able to drill into a workpiece beneath the template as it is guided by the bushing 11.

The direction of rotation of drill bit 24 is indicated by arrow 20 in FIG. 5. This direction of rotation is the standard direction of rotation for drill bits. As bit 24 turns within bushing 11, the friction between the drill bit 24 and the bore 25 of the bushing 11 may cause bushing 11 to turn or rotate in the direction indicated by arrow 22. Since bushing 11 has a left-hand thread which is engaged by lock ring 12, rotation of bushing 11 in the direction of arrow 22 causes lock ring 12 to more tightly grip bushing 11. Thus, as the bushing is used to guide a drill bit, the rotation of the drill bit tends to cause the bushing to be more rigidly gripped by the lock ring and template. Unlike other drill bushings, which tend to loosen with use, the present drill bushing becomes more secure on the template with use.

It is, of course, within the scope of the present invention to utilize a right-hand thread on the bushing 11 where the direction of rotation of a bit is opposite to the standard direction illustrated by arrow 20.

The serrations 16 on drill bushing 11 tend to also prevent the rotation of the bushing within aperture 18. The serrations are not necessary for the operation of the bushing but are an added feature which tends to prevent the rotation of the bushing and secure the bushing to the template while the lock ring is placed on the bushing.

With reference to FIG. 4, if the annular surface 23 is perpendicular to the axis of threads 19 of lock ring 12, which it is in the presently preferred embodiment, tightening of the lock ring on the bushing means causes the bushing to align with aperture 18 of template 10. With the prior art bushings, the operation of securing the bushing to the template often results in a misalignment between the bushing and template. In the present invention, the tightening of the bushing and its use tend to align rather than misalign the bushing with the aperture in the template.

With the bushing and lock ring herein disclosed, the bushing 11 and lock ring 12 may be readily re-used simply by unscrewing the lock ring from the bushing and then by removing the bushing from the template. These operations are not destructive in nature and will not result in any damage to the bushing or lock ring.

It should be further noted that with the template and locking means herein described, a single bushing and lock ring may be utilized with templates of different thicknesses. This is so since the inside diameter of the end of lock ring 12 which abuts template 10 is greater than the diameter of serrations 16.

Another feature of the present invention is that a single lock ring may be utilized with a plurality of bushings. With reference to FIG. 4, the bore 25 may be of any size provided that its diameter is less than the diameter of bushing 11 and the bushing may still be used with a single lock ring 12. This is an advantage over some prior art bushings wherein numerous different locking means are required for different size bushings.

Figure 6:
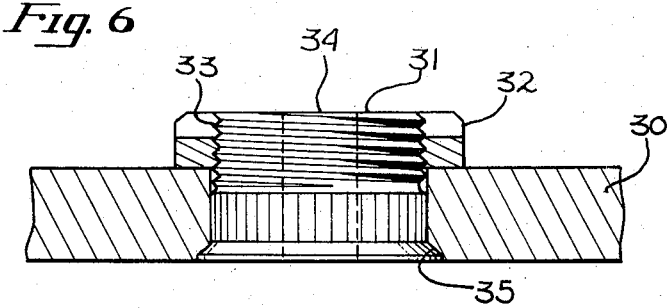
FIG. 6 is a cross-sectional view of a drill bushing and lock ring engaging a thick template.

Referring to FIG. 6, an alternate embodiment of the present invention is illustrated wherein the bushing 31 and lock ring 32, which are substantially similar in construction to the bushing and lock ring illustrated in FIGS. 1, 4 and 5, are coupled to a thick template 3. The drill bushing 31 includes a bore 34 for guiding a drill or other tool, a chamfer 35 for engaging a countersink in template 30, and threads 33 which cooperatively engage threads on lock ring 32. As in the previously described embodiment, left-hand threads are utilized in order that the lock ring 32 does not loosen with use. It can be readily seen from FIG. 6 that by the use of a lock ring 32, which is generally angular in shape, and of shorter length than the lock rings illustrated in FIGS. 1, 4 and 5, a drill bushing built in accordance with the present invention may be utilized on a thicker template such as template 30.

Figure 7:
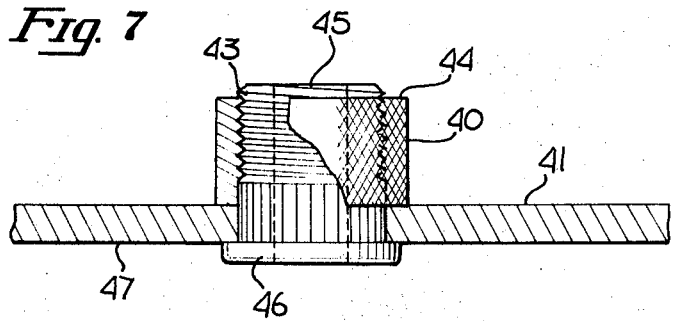
FIG. 7 is a partially cutaway view illustrating a drill bushing, lock ring and template wherein a flange of the drill bushing extends below the surface of the template.

In FIG. 7 an alternate embodiment of the present invention is illustrated, which again includes a lock ring 44 which may be similar to the lock ring illustrated in FIGS. 1, 4 and 5 and a bushing 43 which includes a bore 45. Bushing 43 is similar in construction to the drill bushing discussed in conjunction with FIGS. 1, 3, 4 and 5 except that the end of the bushing opposite the tool entrant end includes a flange 46. This flange has a larger diameter than the aperture into which the bushing 43 is placed. The outer surface of locking means 44 includes an outer knurled surface 40 which improves manual tightening and loosening of lock ring 44 onto the bushing 35 and template 41. In this embodiment no countersink or dimple is needed in the template since the bushing is held in place by the flange 46 and lock ring 40. The flange 46 serves as a support for the template 41; thus, when the template 41 is placed upon a workpiece, the template may be supported by a plurality of such bushings engaging the template and the template will remain above the workpiece. By the use of this embodiment and by machining the lower surface and edges of flange 46 so that they are smooth and contain no rough edges, the workpiece is protected from the surface 47 of the template.

Figure 8:
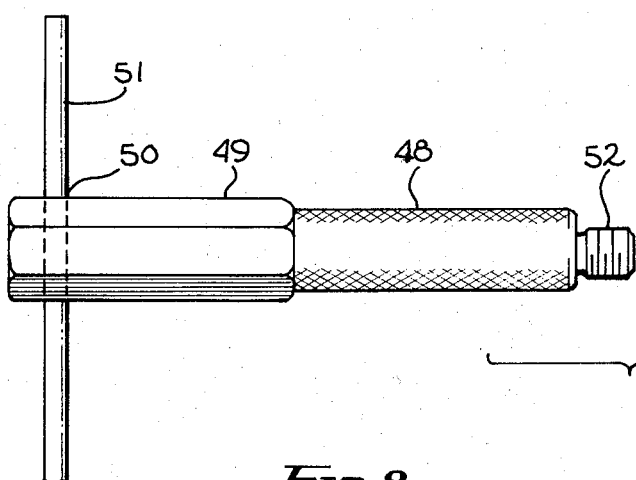
FIG. 8 is an assembly drawing which illustrates a tool which may be utilized to remove bushings built in accordance with the present invention from a template.

Referring to FIG. 8, a tool which may be utilized to remove the lock rings from the bushings and template is illustrated, which comprises a lock ring insertion tip 53 and an elongated handle. The elongated cylindrical handle contains threads 52 at one end, which may be standard right-hand threads, for engaging threads 54 of tip 53. Also, the handle includes a knurled surface 48 and a hexagonally shaped section 49. An aperture 50 is disposed perpendicular to the cylindrical axis of the handle at the end of the handle opposite threads 52 and is adaptable for receiving a rod such as rod 51. The member 53, which is of a generally cylindrical shape, defines a cavity 56 and a pair of diametrically disposed ribs 55 adaptable for engaging notches such as notches 17 shown in FIG. 1.

When it is necessary to remove a lock ring, which includes notches, the handle is threadingly engaged with member 53 and the cavity 56 is placed over the lock ring such that the ribs 55 engage the notches, such as notches 17 of FIG. 1. The lock ring may then be loosened by manually turning the handle, or by placing a wrench on the hexagonal section 49, or by rotating the tool by use of the rod 51. With the use of this tool it has been found that the lock rings may be readily and quickly removed from the bushing and template with little effort and without damage.

The lock rings and bushings illustrated in FIGS. 1, 4, 5, 6 and 7 may also be used for positioning workpieces on a template. It has been found that when a plurality of bushings and lock rings are fastened to a template or other metal member, at predetermined positions, the tool entrant portion of the bushing and the lock ring form guide posts which may be used to align a workpiece on a metal member, template or jig. The disclosed lock ring and bushing are particularly adaptable in this application, since they may be accurately positioned and since the lock ring tends to squarely align the bushing onto a jig, template or other metal member.

Figure 9A:
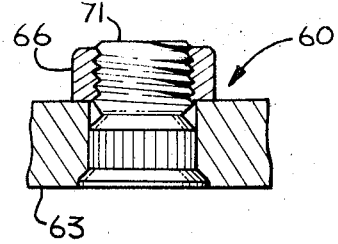
FIGS. 9a, 9b and 9c illustrate in cross-sectional views drill bushings and lock rings engaging templates of different thickness.
Figure 9B:
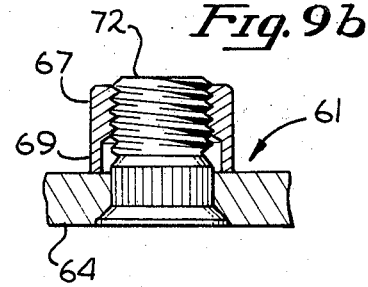
Figure 9C:
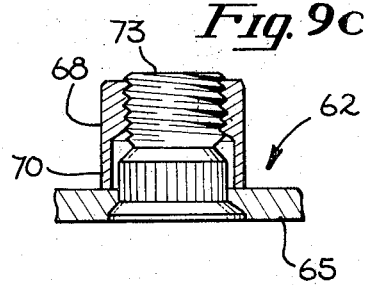

In FIG. 9a, a bushing 71 is secured to a relatively thick template 63 by lock ring 66. As previously discussed, the lower end of ring 66 engages the surface 60 of template 63. In FIG. 9b, bushing 72 is engaging a template 64 of medium thickness. Note that the lower end of lock ring 67 includes a cylindrically shaped end 69 which has an inside diameter larger than the diameter of the serration on the bushing 67. The lower surface of end 69 engages surface 61 of template 64, thereby securing the upper end of bushing 72 to template 61. In FIG. 9c bushing 73 is secured to a thin template 65 by lock ring 68. Note that the lock ring 68 includes a longer cylindrically shaped end 70 than end 69 of lock ring 67. This longer end 70 allows the upper end of the bushing 73 to be secured to the surface 62 of template 65. Thus, by manufacturing lock rings having ends of different lengths a single bushing may be secured to templates having different thicknesses.

I claim:

1. In combination, a thin plate member or jig and a lockable drill bushing means comprising:

a thin plate member having upper and lower parallel surfaces with aperture means extending from said upper to said lower surfaces for retaining a removable bushing therebetween, said aperture means having upper and lower perimeters which are flush with the respective upper and lower plate surfaces;

reuseable bushing means removably disposed within said aperture means including an elongated body of predetermined length, one end of said body being enlarged for preventing said end from passing from the lower surface of said plate member to the upper surface of said plate member, said body being formed with external left-hand threads adjacent the free end of said body for receiving locking means thereon and an inner bore for guiding a drill through said body and underlying plate member, said body projecting substantially outwardly from said upper surface relative to the overall length of said body, said reuseable bushing means having means provided on its external surface at the lower portion thereof for frictional engagement with said thin plate member; and reuseable locking means with internal threads cooperatively removably engageable with said left-hand external threads on said bushing body for securely positioning said bushing against said thin plate member, said locking means being tightened by the rotational movement of a drill as it is guided within said bushing means.

2. The combination of claim 1 wherein said bushing body enlargement is chamfered and said thin plate member aperture is countersunk for receiving said bushing body enlargement chamfer such that said thin plate member has a flush surface when said bushing body is disposed therein.

3. The combination of claim 1 wherein said bushing body includes serration means adjacent the enlarged end for frictionally engaging said thin plate member aperture.

4. The combination of claim 1 wherein said bushing body enlargement is flanged.

* * * * *